(12) United States Patent
Hagarty et al.

(10) Patent No.: US 6,379,166 B1
(45) Date of Patent: Apr. 30, 2002

(54) FIBER OPTIC CABLE OUTLET BOX

(75) Inventors: Robert J. Hagarty, Spokane; David L. Hagarty, Lake Stevens, both of WA (US)

(73) Assignee: Randl Industries, Inc., Spokane, WA (US)

( * ) Notice: Subject to any disclaimer, the term of this patent is extended or adjusted under 35 U.S.C. 154(b) by 2 days.

(21) Appl. No.: 09/603,648

(22) Filed: Jun. 26, 2000

(51) Int. Cl.[7] ................................................ G02B 6/00
(52) U.S. Cl. ........................ 439/135; 439/134; 439/137
(58) Field of Search .............................. 385/135, 136, 385/137, 95, 134

(56) References Cited

U.S. PATENT DOCUMENTS

| | | | |
|---|---|---|---|
| 4,717,231 A | 1/1988 | Dewez et al. | |
| 4,724,281 A | 2/1988 | Nix et al. | |
| 4,874,904 A | 10/1989 | DeSanti | |
| 4,927,039 A | 5/1990 | McNab | |
| 5,012,043 A | 4/1991 | Seymour | |
| 5,074,635 A | * 12/1991 | Justice et al. | 385/95 |
| 5,303,320 A | * 4/1994 | Nix et al. | 385/135 |
| 5,661,840 A | 8/1997 | Caveney | |
| 5,721,394 A | 2/1998 | Mulks | |
| 5,966,492 A | 10/1999 | Bechamps et al. | |
| 5,971,623 A | 10/1999 | Wanamaker | |

FOREIGN PATENT DOCUMENTS

| | | |
|---|---|---|
| EP | 0 293 183 A2 | 11/1988 |
| EP | 0 531 628 A1 | 3/1993 |
| GB | 2 142 736 A | 1/1985 |
| JP | 58-192009 | 11/1983 |
| JP | 63-141008 | 6/1988 |

* cited by examiner

*Primary Examiner*—Brian Sircus
*Assistant Examiner*—Chandrika Prasad
(74) *Attorney, Agent, or Firm*—Christensen O'Connor Johnson Kindness PLLC

(57) ABSTRACT

A cable outlet box for in-wall installation is disclosed that is particularly well suited for optical fiber cable network applications. The outlet box is larger than conventional outlet boxes in the transverse direction, to allow optical fibers to be maintained with a bending radius that is greater than the optical fiber's minimum bending radius, the minimum radius beyond which damage to the optical fibers can result. The depth of the outlet box is selected to allow installation within walls without protruding from a wall. Cable retainers, about which an excess length of cable may be coiled, extend inwardly from the rear panel into the outlet box. An extension ring, similar to conventional extensions rings, but adapted to attach to the larger outlet box, extends through the wall panel thickness for recet of fixtures such as fiber optic connector strips, low voltage copper communications strips, audio, video, security or other such cabling. The cable outlet box is also suited to mixed applications, allowing fiber optic cables and low voltage cables to share a single outlet box.

11 Claims, 5 Drawing Sheets

FIBER OPTIC CABLE OUTLET BOX

FIELD OF THE INVENTION

This invention relates in general to communications outlet boxes and, more particularly, to outlet boxes for fiber optic and low voltage communications cables.

BACKGROUND OF THE INVENTION

In this information age, the consumer's seemingly insatiable demand for increasing bandwidth is pushing the communications industry to provide ever-larger information "pipes" into the user's home or business. It is predicted that soon the demand for unlimited bandwidth will exceed the capacity of electron-driven information delivery systems. Light- or photon-driven information delivery systems, such as fiber optic cable systems, are being used more and more to meet the consumer's demand for instantaneous access to information, entertainment, and communications.

Optical fiber cable has already replaced metallic cable in the backbone networks of most local and long-distance telephone carriers, cable television operators, and utility companies. Fiber optic cable systems are also rapidly gaining ground in commercial settings, including office buildings and factories. Optical fiber cable technology has been slower to bridge the so-called "last mile bottleneck" from backbone networks into residential homes and smaller businesses, however, due to high costs and slightly-lagging consumer technology demand for high bandwidth capability.

With the increasing use of high-definition television, digital consumer electronic devices, always-on Internet connections, and related digital and information technologies, however, there is a growing market demand for greater information bandwidth in the home and office. In addition to bridging the gap from commercial backbone networks to residences and small businesses, there is also an increasing demand for high-bandwidth intra-residential and intra-office communication systems, enabling, for example, high-speed home networks and multiple high-bandwidth external connections. Concurrent with the increased demand for high-bandwidth networks has been the development of new technologies and standards that are making such networks economically viable. For example, plastic optical fiber (POF) cable promises to bring down the costs of optical fiber cable and is easier to interconnect to form the network and interface with digital devices. The adoption of the IEEE-1394 1995 Standard for a High Performance Serial Bus, sometimes referred to as the FireWire standard, is also playing an important role in enabling economical high-bandwidth systems. FireWire is on its way to becoming the standard method of connecting digital audio and video electronic devices to personal computers.

The introduction of fiber optic cable networks into homes and small businesses requires, inter alia, the installation of individual fiber optic communication outlet boxes, typically in multiple locations, such as individual offices, for connecting to the fiber optic cable network. The installation of optical fiber cable, however, presents different physical requirements than does the installation of conventional copper wire cable. Conventional outlet boxes designed for copper wire cable applications are not optimal for use with optical fiber cable systems. Optical fiber cable can be damaged if the cable is bent or coiled with a radius of curvature smaller than a minimum bend radius. A typical minimum bend radius for an optical fiber cable is approximately 50 mm, or about two inches. Conventional outlet boxes are four inches square, one and one-half or two and one-eighth inches deep, and therefore can only just barely accommodate the typical minimum optical fiber cable bend radius of two inches (four inches in diameter) with no margin to facilitate installing the optical fiber cable into the outlet box.

When installing copper wire cable systems, the bending radius of the wire is generally not a concern. It is typical for installers to make the required electrical connections and then force any excess cable into the junction or outlet box prior to installing the outlet box cover or fixture. This practice is not desirable for optical fiber cable systems due to the sensitivity of the optical fibers to the bending radius. It is desirable and common practice, however, to include some extra length of optical fiber cable in the outlet box so that if the fixtures are replaced in the future, or if the cable fibers are damaged, a section of optical fiber cable may be removed and sufficient cable will remain to make the desired connections. Some means for maintaining the optical fiber cable minimum bend radius in the excess cable is desirable for optical fiber cable outlet boxes. It is particularly desirable to provide such means in fiber optic cable outlet boxes as this technology becomes more wide spread, because less specialized workers and home do-it-yourselves will increasingly be installing fiber optic cable systems.

One common method for providing extra room in prior art outlet boxes is to add an extension onto the front of the outlet box, that extends out from the main body of the outlet box. While this method provides a larger volume to store optical fiber cable, it does not provide a means for ensuring the stored cable is maintained in a coil having a radius larger than the minimum bending radius of the optical fibers forming the cable. Also, the resulting fixture will frequently and undesirably project out from the wall into a room, which may be inconvenient, hazardous and/or aesthetically unappealing, and may expose the outlet box to unnecessary jostling and impacts.

A fiber optic cable junction box that maintains a large bending radius for optical fiber cable located in the junction box is disclosed in U.S. Pat. No. 5,661,840 to Caveney. This patent describes a junction box with removable clips 26 and spools 27 for positioning and arranging fiber optic cables. The spools presumably are larger in radius than the minimum bend radius of the optical fiber cable. This design, however, requires a large junction box, because the cylinders fill a large portion of the volume of the box. The cylinders limit the volume available for other purposes and may get in the way of the installer.

U.S. Pat. No. 4,717,231 to Dewez et al. discloses a distributing box for optical fiber cable that comprises a first receptacle 10, a second receptacle 11 and a movable panel 12 therebetween. The movable panel includes four U-shaped gulleys 124 holding the fibers in a curvilinear bundle with a minimum bending radius r=50 mm. The disclosed gulleys, however, "are oriented toward the interior of rear compartment 100." The gulleys disclosed by Dewez et al. therefore, function to hold the optical fiber cable and limit the maximum radius of the fiber cable, but not the minimum bending radius. For example, if the exterior portion of the cable is pulled, the gulleys would not prevent the optical fibers from tightening up to less than the minimum bend radius. European patent No. 0 293 183 (Bylander) discloses an optical fiber cable distribution panel having a cover 80 with a plurality of fiber retaining lips 85, 86, and 87 formed therein to retain slack fiber cable, as seen most clearly in FIG. 8. The disclosed lips, are generally formed with the lip facing inward, similar to Dewez et al.'s disclosed invention. The retaining lips function to hold the optical fiber cable when the cover is opened and closed, but again will not prevent the cable from tightening into a loop smaller than the fibers minimum bend radius.

U.S. Pat. No. 5,966,492 to Bechamps et al. teaches an apparatus for storing and splicing optical fiber cable, having a tray 10 that slidably mounts to a cabinet 32 for holding and splicing optical fiber cables. The tray includes a portion for storing optical fiber cable that has a number of retainers 16, 17, 18, and 19 for retaining extra optical fiber cable. Although Bechamps et al. states that the retaners prevent the cable from being bent beyond its minimum bend radius, it appears from examining FIG. 4 and FIG. 5, and the disclosure contained at column 4, beginning at line 25, that the retainers will not limit the minimum bending radius of the optical fiber cable. In particular, as in the disclosures above, if the optical fiber cable external ends are pulled, the retainers will not impede the cable coil from reducing its coiling radius below the fiber's minimum bend radius.

These prior art patents are generally directed to large, free standing or externally-mounted, cabinets, which are normally referred to as "patch panels" within the communications industry. As optical fiber cable begins to be installed to individual offices within an office building of any size, an "in-wall" optical fiber cable outlet box will be desirable. As noted above, conventional electrical outlet boxes, which are four inches square in cross-section, are only marginally large enough to accommodate fiber cables having a minimum bend radius of two inches. Because optical fiber cable must be manipulated when it is inserted into the outlet box, and making the appropriate connections, it is desirable that an optical fiber cable outlet box be larger than four inches square in cross-section, but still be small enough to fit within a conventional wall, and installable by conventional means such as a bar hanger or side bracket.

U.S. Pat. No. 5,721,394 to Mulks discloses a flush-mountable junction box, for use with fiber optic communications cable. Mulks describes a box wherein the optical fiber cable enters the top of the box 1, and pass through a strain relief member 4, and is connected to panel 7 mounted connectors 17. No means are provided to maintain a cable radius that is greater than the minimum fiber optic bend radius. The connection box disclosed by Mulks has the disadvantage of being significantly larger than conventional electrical outlet boxes and would require a large hole be cut into the wall to install the box. Mulks also teaches leaving the connection box open on one side, for the passage of cable therethrough. However, this leaves the interior of the box susceptible to intrusion and damage by insects and/or small nuisance animals.

For the foregoing reasons, there is a need for a fiber optic cable outlet box that has a means for retaining cable with a preselected minimum bending radius, and in particular with a minimum bending radius greater than two inches. There is also a need for such an outlet box that is installable so as to be generally flush-mounted in walls in a manner similar to conventional electrical outlet boxes, and wherein the outlet box cooperatively provides a generally enclosed and protectet volume.

SUMMARY OF THE INVENTION

The present invention is directed to an outlet box that satisfies the needs discussed above. More specifically, the invention is directed to providing a communications outlet box that is particularly suited for applications that include optical fiber cables. The invention is directed to an in-wall outlet box that is larger than conventional in-wall outlet boxes, and includes a means for retaining extra cable in the outlet box while maintaining a predetermined minimum bending radius.

According to one aspect of the present invention, the fiber optic communications outlet box comprises a rear panel approximately five inches square, four generally rectangular side panels, not more than two and seven-eighths inches wide, that cooperatively with the rear panel form a box having an open face, tabs extending inwardly from the side panels, and cable retainers extending inwardly from the rear panel about which a cable may be coiled and that are spaced to maintain a minimum bending radius in the cable of not less than about two inches.

According to another aspect of the invention, the cable retainers are generally L-shaped, with the first leg of the retainer that is connected to the rear panel having a curved profile whereby a cable coiled around the cable retainers will not encounter a sharp edge.

According to another aspect of the present invention, the communications outlet box further comprises an extension ring that partially covers the open face of the outlet box, and includes a rectangular extension sized to match the thickness of the wall panels into which the extension ring will be installed, and adapted to have a fixture such as a fiber optic connector strip attached to the extension ring.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
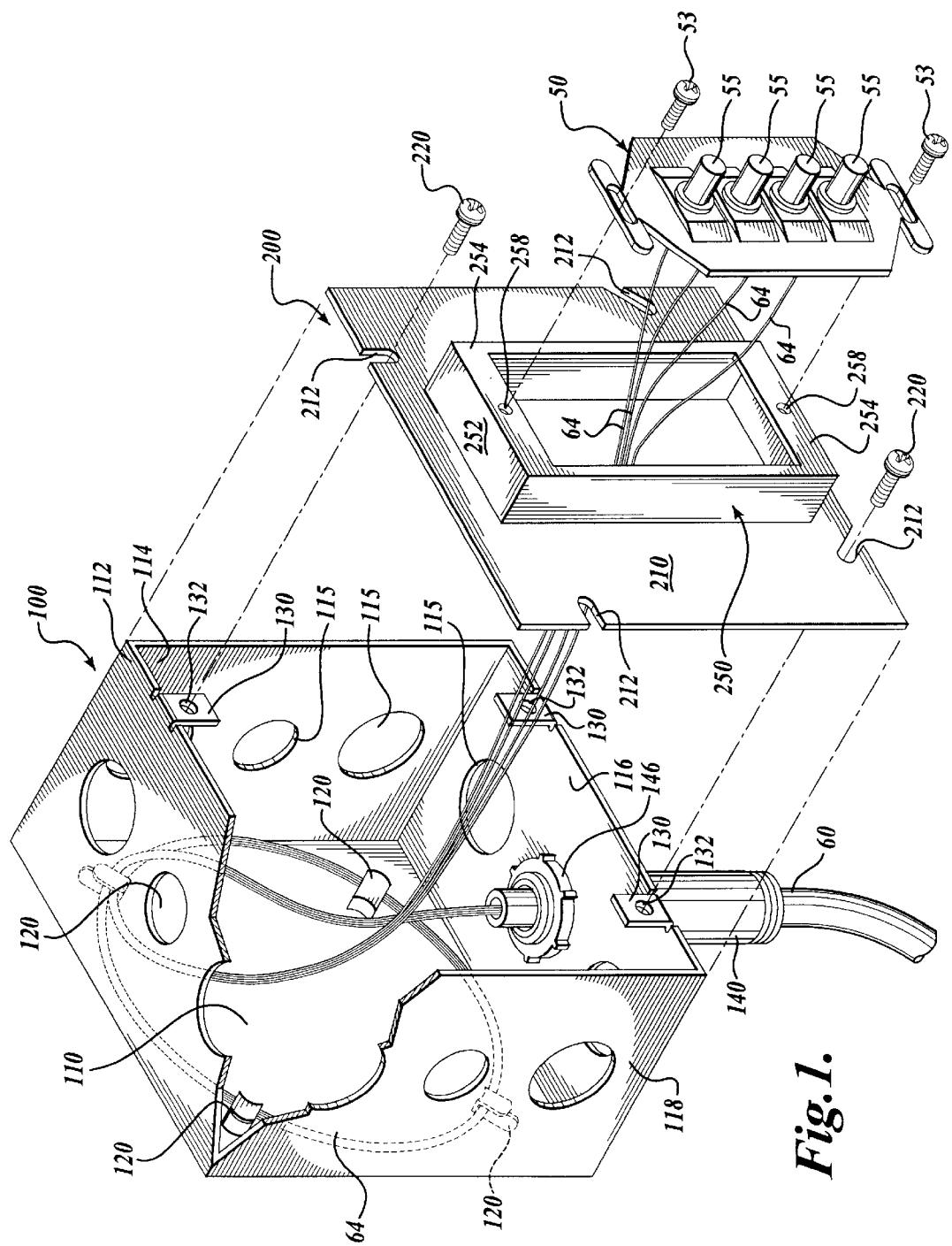
FIG. 1 shows a perspective, partially cutaway, exploded view showing a communications outlet box assembly formed in accordance with the present invention.

Referring now to the drawings, wherein like numbers indicate like parts, FIG. 1 is a perspective, partially cutaway view of a fiber optic communications outlet box 100 formed in accordance with the present invention in combination with an extension ring 200 and a four-connector optical fiber connector strip 50. The outlet box 100 comprises a substantially square rear panel 110 that is preferably approximately five inches long on each side. Depending forwardly from the rear panel 110 are a top panel 112, a right side panel 114, a bottom panel 116, and a left side panel 118, collectively referred to herein as side panels. The side panels 112, 114, 116, 118 are preferably five inches in length and approximately two and seven-eighths inches wide, and cooperatively with the rear panel 110, form a rectangular box having an open front face.

Figure 3:
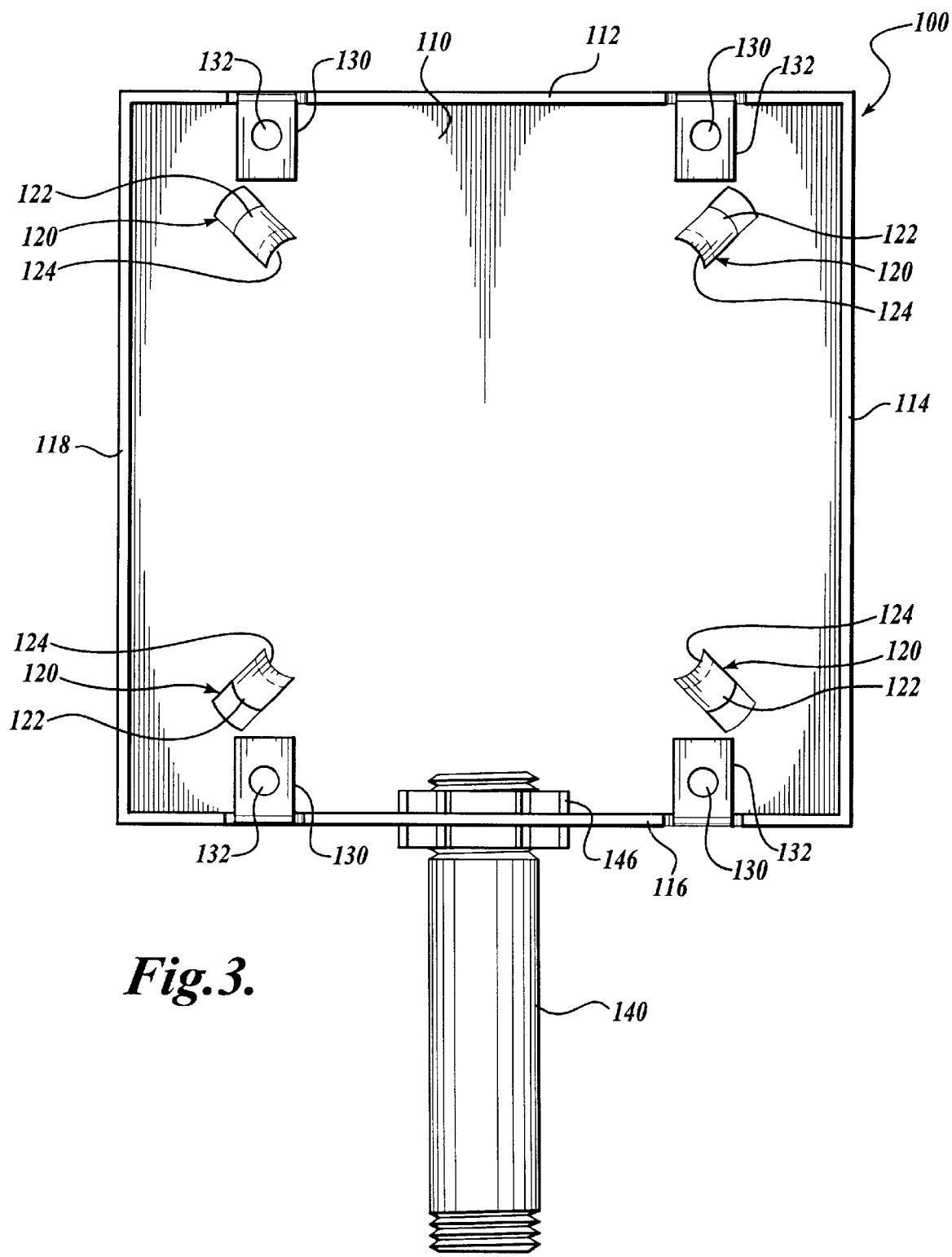
FIG. 3 shows a front elevation view of the embodiment of the invention shown in FIG. 1.

A cable, such as a fiber optic cable 60, is provided to the communications outlet box 100 through conduit 140. The back panel 110 is provided with a plurality of cable retainers 120 for retaining a length of optical fibers 64 included in the fiber optic cable 60. If copper wire cable is used, cable retainers 120 could be used to retain a length of insulated copper wire. In the preferred embodiment four cable retainers 120 are arranged in a generally square array. The cable retainers 120 are generally L-shaped, opening outwardly from the center of outlet box 100, and are spaced with a diagonal distance at least twice the minimum bending radius of the optical fibers 64. As can be seen most clearly in FIG. 3, the first leg 124 of each cable retainer 120 extending inwardly from the back panel 110 is curved concavely, so that optical fibers 64 coiled around the cable retainers 120 do not encounter a sharp edge. The second leg 122 of each cable retainer 120 lies generally parallel to the back panel 110.

While, preferably, the outlet box 100 is formed of metal and the cable retainers 120 are unitarily formed with and stamped outwardly from back panel 110, it is to be understood that the outlet box 100 could be formed of other materials and the cable retainers formed by separate pieces attached to the back panel 110, or mounted on a separate panel inserted into the outlet box 100.

Four tabs 130 extend inwardly from top panel 112 and bottom panel 116, and are generally parallel to back panel 110. Each tab 130 includes a threaded hole 132 adapted to receive an attaching screw 220. Conventional circular knock-outs 115 are provided in the side panels 112, 114, 116, 118 that can be removed as necessary to provide cable access to the interior of the outlet box 100.

An extension ring 200 having a perimeter generally matching the perimeter of the open face of outlet box 100 is also shown in FIG. 1. The extension ring 200 includes a flat square annular flange 210 that includes four mounting slots or orifices 212 adapted to match the tabs 130 on outlet box 100, whereby the extension ring 200 may be attached to the outlet box 100. A rectangular (extension 250 projects forwardly from annular flange 210. The extension 250 includes a raised portion 252 that lies generally perpendicular to the flange 210. The raised portion 252 has a width that matches the thickness of the wall into which the extension ring 200 will be installed. For example, sheet rock installed for internal walls is typically five-eighths inch thick. An extension ring that is to be installed in such a typical wall would therefore have a raised portion that is approximately five-eighths inch wide. In many office hallway walls two layers of conventional sheet rock are used. A raised portion one and one-quarter inches wide (2×⅝) would be required for these walls.

The extension 250 includes a pair of inwardly extending second flange members 254 that lie on opposite sides of the raised portion 252 and are generally perpendicular to the raised portion 252. The second flange members 254 have threaded holes 258 adapted to receive screws 53 for attaching a fixture, such as a strip 50 of fiber optic connectors 55, to the extension ring 200. A conventional cover plate 57 (not shown in FIG. 1, for clarity) would typically be installed over the connector strip 50.

Figure 2:
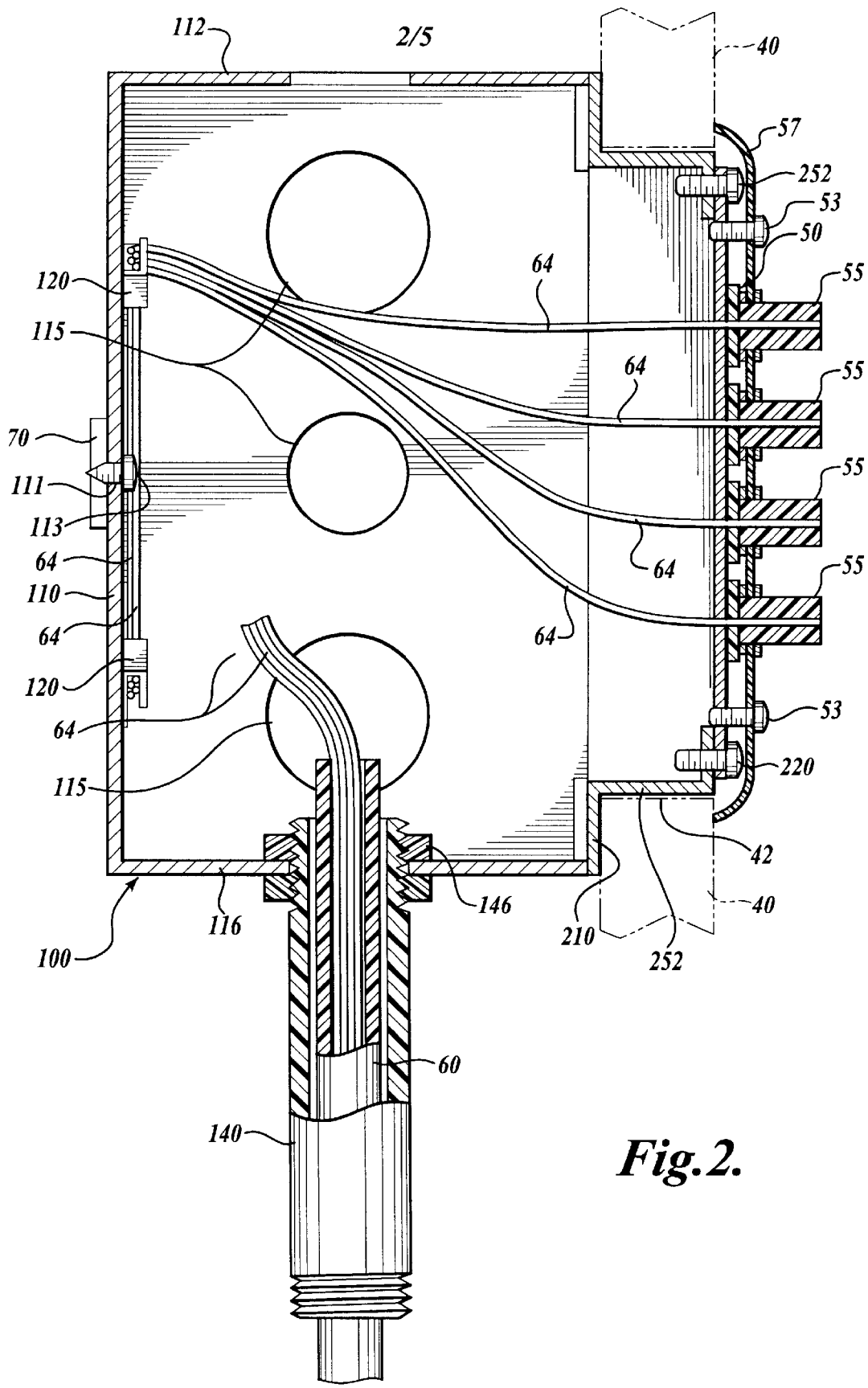
FIG. 2 shows a cutaway side elevation view of the embodiment of the invention shown in FIG. 1.

FIG. 2 is a cross-sectional view of the embodiment of the invention shown in FIG. 1, installed in wall 40. Wall 40 is generally the same thickness as the raised portion 252, and has an aperture 42 that is slightly larger than the outer perimeter of the raised portion 252, whereby the raised portion 252 can be slidably inserted into the wall aperture 42 such that the rectangular extension 250 is generally flush with the front surface of wall 40. The cable 60 enters the outlet box 100 through the conduit 140 attached to the bottom panel 116 with a locknut 146. A length of optical fibers 64 is coiled about the cable retainers 120 prior to being attached to the fiber optic connectors 55. The extension ring 200 is attached to the outlet box 100 with a plurality of metal screws 220, and the optical connector strip 50 is attached to the extension ring 200 with a plurality of screws 53.

The lateral dimensions of the outlet box 100 (approximately five inches by five inches square) are larger than conventional, prior art outlet boxes. As a result, the outlet box 100 is able to accommodate a coil of optical fibers 64 while maintaining a minimum fiber bending radius greater than about two inches (approximately 50 mm), a typical minimum bending radius for optical fibers. The outwardly-facing L-shaped cable retainers 120 are positioned to enforce a coil radius larger than the optical fiber minimum bending radius.

Figure 4:
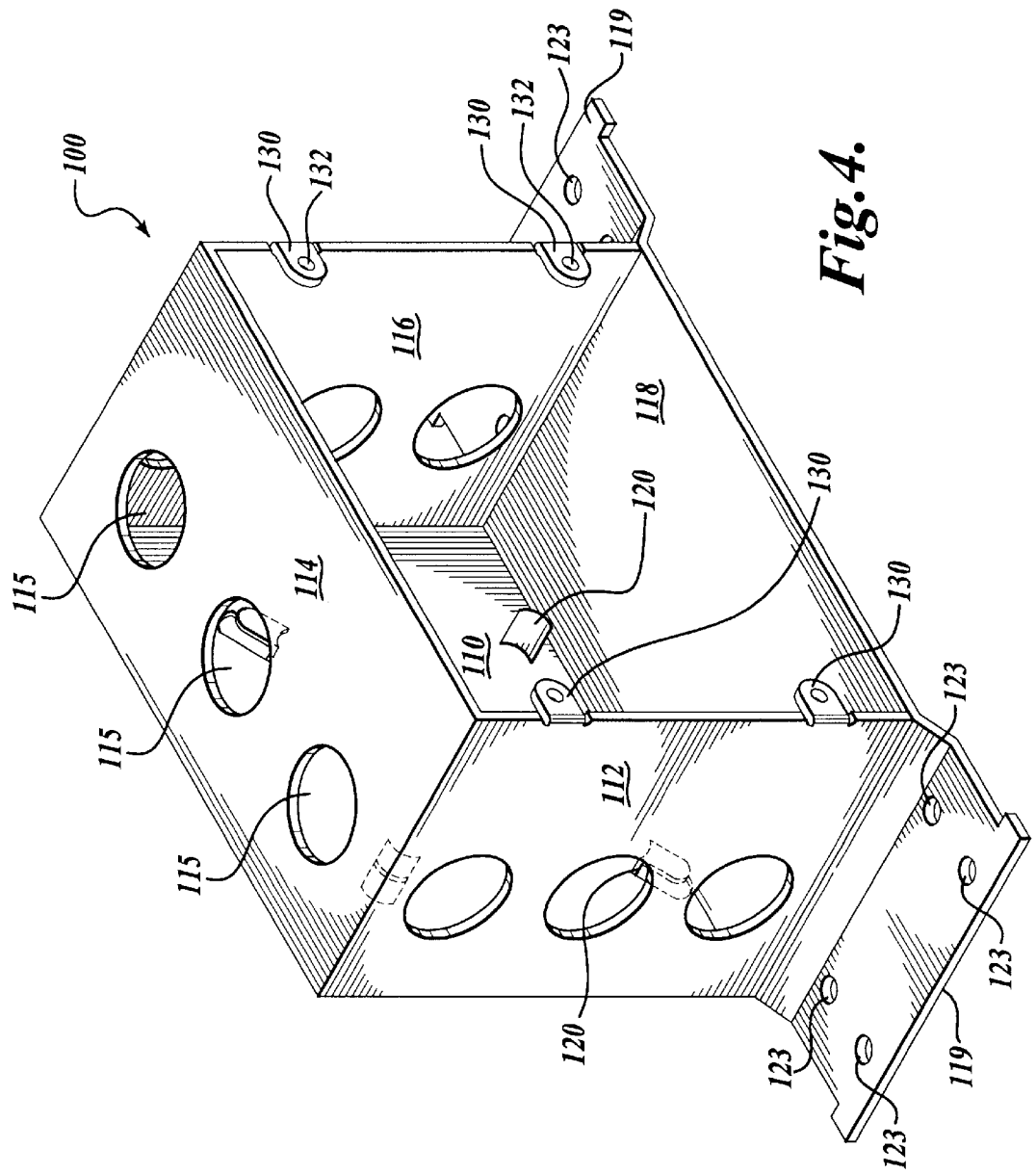
FIG. 4 shows a perspective view of a communications outlet box component having integral mounting brackets.

As can be seen most clearly in FIG. 2, the outlet box is installed in the wall using a conventional outlet box bar hanger 70 which consists of a beam mounted horizontally between wall studs. Mounting holes 111 are provided through the back panel 110 and adapted to accommodate screws 113 that attach outlet box 100 to bar hanger 70. A second embodiment of the invention is shown in FIG. 4. The FIG. 4 embodiment includes an integral mounting bracket 119 that replaces one of the side panels 112, 114, 116, 118 for installing the outlet box in a wall. The mounting bracket 119 extends generally parallel to a side panel and include a plurality of apertures 123 for attachment of the outlet box 100 to a wall stud.

Figure 5:
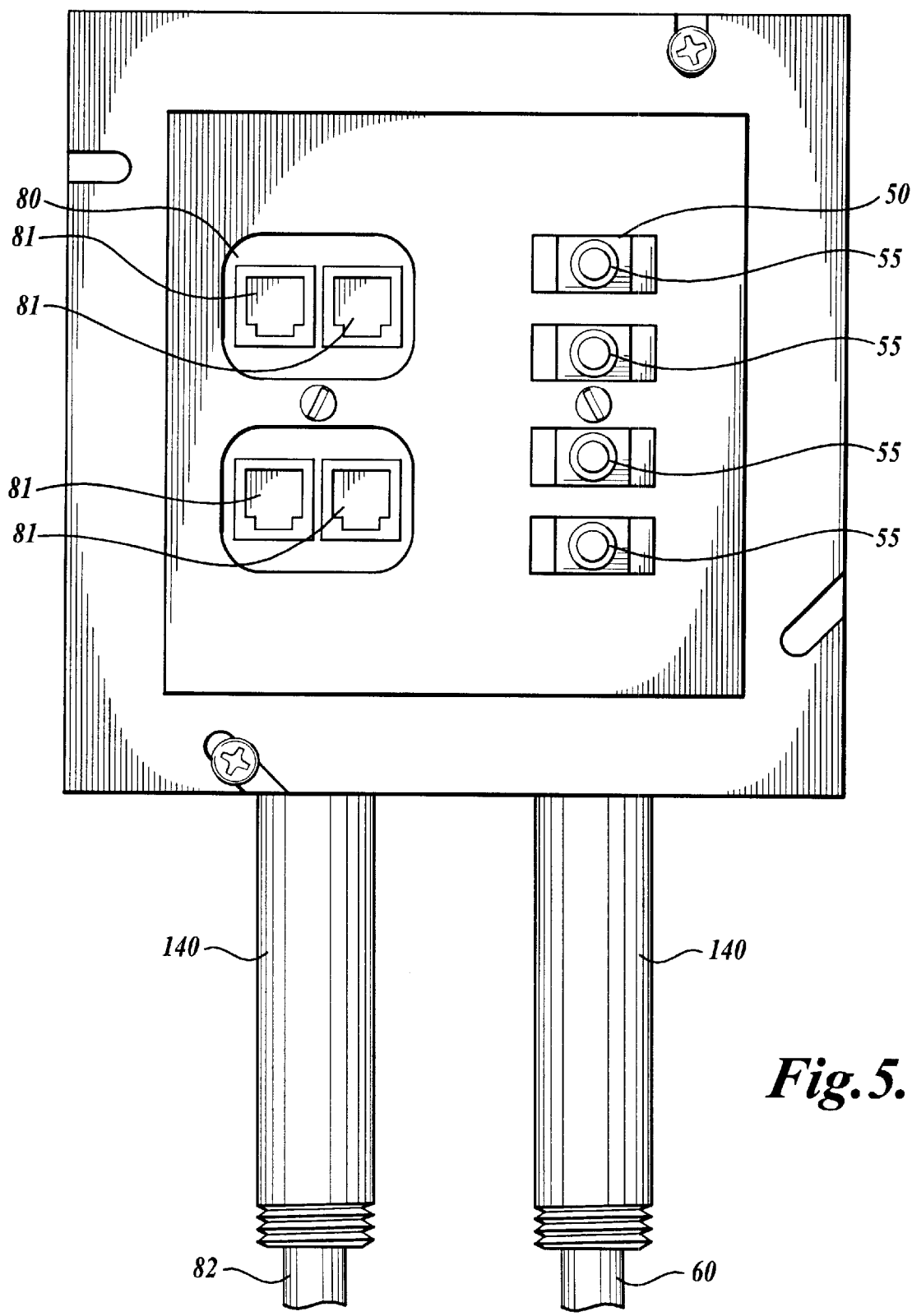
FIG. 5 shows a front elevation view of an embodiment of the present invention, wherein both electrical and fiber optic components are installed in a two-gang configuration.

A third embodiment of the invention is shown in FIG. 5. The FIG. 5 embodiment is a two-gang configuration of the present invention that includes a four-socket 81, 4-pair, unshielded, twisted pair, low voltage communications outlet strip 80 mounted in the communications outlet box 100 next to the optical connector strip 50. Two cable-channeling conduits 140 enter the outlet box 100 from one of the side panels 112, 114, 116, 118, one carrying low voltage communications wires 82 for the outlet strip 80 and the other carrying fiber optic cable 60. It would be obvious to one of ordinary skill in the art that embodiments of the invention can include other options, either alternatively or in addition to those shown, for example, modular telephone jacks, audio jacks, cable television jacks, and the like.

The additional volume provided by unique five-inch square by two and seven-eighths inch thick outlet boxes formed in accordance with this invention is particularly advantageous for applications wherein more than one service (i.e. optical, telephone, data, coaxial, etc.) is to be provided in a single outlet box. As discussed above, the cable retainers 120 are ideally suited for maintaining the minimum bend radius required by optical fibers 64, particularly when additional wiring is to be installed in the outlet box 100 that might otherwise interfere with, or become entangled with, the optical fibers 64.

While the presently preferred embodiments of the invention have been illustrated and described, it will be appreciated that, within the scope of the appended claims, various changes can be made therein without departing from the spirit of the invention.

The embodiments of the invention in which an exclusive property or privilege is claimed are defined as follows:

1. A communications outlet box comprising:
   a substantially square rear panel having four edges, each edge being approximately five inches long;
   four generally rectangular side panels that are approximately five inches long and not more than two and seven-eighths inches wide, each side panel extending forwardly from one of said rear panel edges, the rear panel and side panels thereby forming a box having an open face; and a plurality of cable retainers extending forwardly from said rear panel, said cable retainers adapted to maintain a minimum bending radius in a cable wrapped around the cable retainers of not less than two inches.

2. The communications outlet box of claim 1 wherein said cable retainers each comprise an extension portion and a retainer portion, said extension portion extending into the interior of said box from said rear panel and having a proximal edge adjoining to said rear panel, and wherein said retainer portion is generally planar and lies in a plane approximately parallel to said rear panel.

3. The communications outlet box of claim 2 wherein said cable retainers and said rear panel are formed from a single piece of material.

4. The communications outlet box of claim 2 wherein each said cable retainer extension portion is curved.

5. The communications outlet box of claim 4 wherein said cable retainers and said rear panel are formed from a single piece of material.

6. The communications outlet box of claim 1 further comprising an extension ring, said extension ring being attachable to said box.

7. The communications outlet box of claim 6 wherein said extension ring comprises a square flange portion forming an outer square approximately five inches on a side and a rectangular inner aperture, a perpendicular portion extending forwardly from said rectangular inner aperture having an extension dimension selected to match a wall thickness, and means for attaching at least one connector fixture to said extension ring.

8. A fiber optic communications outlet box comprising:
   (i) a rectangular box having a generally square back panel that is larger than four inches long in each transverse direction, four rectangular side panels depending vertically from said back panel and an open front face;
   (ii) a plurality of L-shaped outwardly opening cable retainers extending from said back panel into said box; and
   (iii) an extension ring adapted to attach over said open front face of said box, said extension ring comprising a square annular flange having a rectangular aperture therethrough and a rectangular extension having a proximal edge connected to said flange over said rectangular aperture and a distal edge extending forwardly from said flange, and a mechanism for attaching a fiber optic connector strip to said rectangular extension.

9. The fiber optic communications outlet box of claim 8 wherein said square back panel is at least five inches long in each transverse direction.

10. The fiber optic communications outlet box of claim 8 wherein said plurality of cable retainers each comprise a curved portion extending at a right angle from said back panel and a retainer portion depending outwardly from said curved portion.

11. The fiber optic communications outlet box of claim 8 further comprising a cylindrical conduit that penetrates one of said four rectangular side panels thereby providing a channel into said outlet box.

* * * * *